United States Patent
Forsman et al.

(10) Patent No.: US 9,301,207 B2
(45) Date of Patent: Mar. 29, 2016

(54) QUALITY OF SERVICE CONTROL

(75) Inventors: Maud Forsman, Vargon (SE); Folke Ahlstrom, Vastra Frolunda (SE); Josefin Karlsson, Torslanda (SE); John Stenfelt, Gothenburg (SE); Yong Yang, Molndal (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 200 days.

(21) Appl. No.: 13/883,443

(22) PCT Filed: Nov. 5, 2010

(86) PCT No.: PCT/EP2010/006745
§ 371 (c)(1),
(2), (4) Date: Jul. 22, 2013

(87) PCT Pub. No.: WO2012/059118
PCT Pub. Date: May 10, 2012

(65) Prior Publication Data
US 2014/0146746 A1      May 29, 2014

(51) Int. Cl.
*H04W 28/24*   (2009.01)
*H04W 88/18*   (2009.01)
*H04W 28/16*   (2009.01)

(52) U.S. Cl.
CPC .............. *H04W 28/24* (2013.01); *H04W 88/18* (2013.01); *H04W 28/16* (2013.01)

(58) Field of Classification Search
None
See application file for complete search history.

(56) References Cited

U.S. PATENT DOCUMENTS

| | | | |
|---|---|---|---|
| 2011/0171953 A1* | 7/2011 | Faccin et al. | 455/426.1 |
| 2012/0269167 A1* | 10/2012 | Velev et al. | 370/331 |
| 2012/0284394 A1* | 11/2012 | Rasanen | 709/224 |

FOREIGN PATENT DOCUMENTS

EP       2104275 A1       9/2009

OTHER PUBLICATIONS

3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 10); 3GPP TS 23.401 V10.1.0, Sep. 2010; 10 pages.

(Continued)

*Primary Examiner* — Ian N Moore
*Assistant Examiner* — Eric H Wang
(74) *Attorney, Agent, or Firm* — Rothwell, Figg, Ernst & Manbeck, P.C.

(57) ABSTRACT

A mobility management node (120, 125), arranged to serve a User Equipment, UEs (130) in a Public Land Mobile Network, a PLMN, also arranged to have an interface towards a Serving Gateway, an SGW (115). The mobility management node (120, 125) is arranged to, upon reception of one or more predefined messages from a UE (130) or in case of a change of mobility management node and/or PLMN for the UE (130), send a message to the SGW (115), comprising information on the maximum Quality of Service for the UE (130) allowed by the mobility management node (120, 125) and information on the subscribed Quality of Service for the UE (130), the mobility management node (120, 125) being arranged to receive a response message from the SGW (115), and to, as a result of the response message, implement a limitation of the UEs (130) Quality of Service.

12 Claims, 5 Drawing Sheets

(56) References Cited

OTHER PUBLICATIONS

3GPP, "Modifying and rejection bearer level QoS parameter for default bearer", 3GPP 23.401 CR 1699, rev 1, Version 8.10.0; 3GPP TSG SA Meeting #80, Aug. 30-Sep. 3, 2010; 4 pages.

3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 9); 3GPP TS 23.401 V9.4.0, Mar. 2010; 258 pages.

* cited by examiner

QUALITY OF SERVICE CONTROL

CROSS-REFERENCE TO RELATED APPLICATION(S)

This application claims priority to International Patent Application No. PCT/EP2010/006745, filed Nov. 5, 2010, which is incorporated by reference in its entirety.

TECHNICAL FIELD

The present invention discloses a node and a method for improved control of quality of service, QoS, for User Equipments, UEs.

BACKGROUND

In wireless access systems such as, for example, 2G/3G and LTE systems, problems may arise for User Equipments, UEs, in certain situations such as, for example, roaming or mobility procedures, for example when the UE enters a network which belongs to a different operator, i.e. a change of the so called PLMN, the Public Land Mobile Networking. These problems may lead to termination of the UE's connection to the system or to the UE receiving a lower level of Quality of Service, QoS, than possible. The problems are due to limited functionality in the core network. In case of 2G/3G systems, the maximum QoS for an UE is limited by the capability or policies of the so called S4-SGSN which the UE is served by, and in the case of LTE the problems may be due to the corresponding factors in the corresponding node, the Mobility Management Entity, the MME, which the UE is served by. The MME and the S4-SGSN will also be referred to here by the generic term "mobility management node".

SUMMARY

It is a purpose of the present invention to offer an improved mobility management node, in which the problems mentioned above are eliminated or at least largely obviated.

This purpose is addressed by the present invention in that it discloses a mobility management node for a wireless access system. The mobility management node is arranged to serve one or more User Equipments, UEs, in a Public Land Mobile Network, a PLMN, and is also arranged to have an interface towards a Serving Gateway, an SGW, of the wireless access system.

The mobility management node is arranged to, upon reception of one or more predefined messages from a UE, or in the case of a change of mobility management node and/or PLMN for the UE, send a message to the SGW, with the message comprising information on the maximum Quality of Service for the UE as allowed by the mobility management node, as well as information on the subscribed Quality of Service for the UE.

The mobility management node is also arranged to receive a response message from the SGW, and to, as a result of the response message, implement a limitation of the UEs Quality of Service.

In some embodiments, the mobility management node is arranged to implement the limitation of the UEs Quality of Service as a result of an indication in the response message that the SGW and a Packet Data Gateway, a PGW to which the SGW interfaces, support limitations of the UEs Quality of Service by the mobility management node, and the mobility management node is arranged to, as a result of the reception of said indication, limit the UEs Quality of Service so that it corresponds to the Quality of Service allowed by the mobility management node.

In some embodiments, the mobility management node is arranged to implement the limitation of the UEs Quality of Service as a result of an indication in the response message indicating a level of Quality of Service for the UE decided by the PGW or by a unit for Policy and Charging Rules Function to which the PGW interfaces.

Also, if the response message is not received from the SGW, the mobility management node will interpret this as a lack of support in the SGW and thereby in the system as such, for limitations of the UEs QoS in the mobility management node.

In some embodiments, the mobility management mode is a Mobility Management Entity, an MME, for an LTE system.

In some of the "MME embodiments", the one or more predetermined messages from the UE include at least one of an attach request message, a PDN connectivity request message and a Tracking Area Update messages.

In some of the "MME embodiments", the message to the SGW is a Create Session request message or a Modify Bearer Request message.

In some embodiments, the mobility management mode is an S4-SGSN for a 2G/3G system, sometimes also referred to as a GERAN/UTRAN system.

In some of the "S4-SGSN embodiments", the one or more predetermined messages from the UE include at least one of an Activate PDP context request message and Routing Area Update request messages.

In some of the "S4-SGSN embodiments", the message to the SGW is a Create Session request message or a Modify Bearer Request message.

In both some of the "S4-SGSN embodiments" and some of the "MME embodiments", the response message from the SGW is one of the messages Create Session Response or Modify Bearer Response.

The invention also discloses a Packet Data Network Gateway, a PGW, for a GERAN/UTRAN or LTE system. The PGW is arranged to receive a message from a mobility management node in the system via a Serving Gateway, an SGW, of the system, which message comprises information on the maximum Quality of Service allowed by the mobility management node for a UE which is served by the mobility management node, as well as information on the subscribed Quality of Service for the UE.

In some embodiments, the PGW is arranged to transmit the maximum Quality of Service for the UE to a unit for Policy and Charging Rules Function, a PCRF, and to receive a reply from the PCRF, a reply which comprises a decision on a maximum Quality of service for the UE, and the PGW is also arranged to forward this reply to the SGW.

In some embodiments, the PGW is arranged to, in the absence of a unit for Policy and Charging Rules Function, a PCRF, to take a decision on the maximum Quality of service for the UE, with the decision not exceeding the maximum Quality of service for the UE as allowed by the mobility management node, and to forward this reply to the SGW.

In some embodiments, the PGW is arranged to respond to the message from the SGW by means of a message indicating that it supports limitations of the UEs Quality of Service by the mobility management node.

Regarding the term Quality of Service, this term includes one or more parameters, which vary between different systems, but which can be referred to by the commonly used term "Bearer Level QoS parameters". Non-exclusive examples of such parameters are:

APN-AMBR, Access Point Name Aggregate Maximum Bit Rate,
ARP, Allocation and Retention Priority,
QCI, QoS Class Identifier,
Maximum bit rate for uplink
Maximum bit rate for downlink
Guaranteed bit rate for uplink
Guaranteed bit rate for downlink

BRIEF DESCRIPTION OF THE DRAWINGS

The invention will be described in more detail in the following, with reference to the appended drawings, in which.

DETAILED DESCRIPTION

Figure 1:
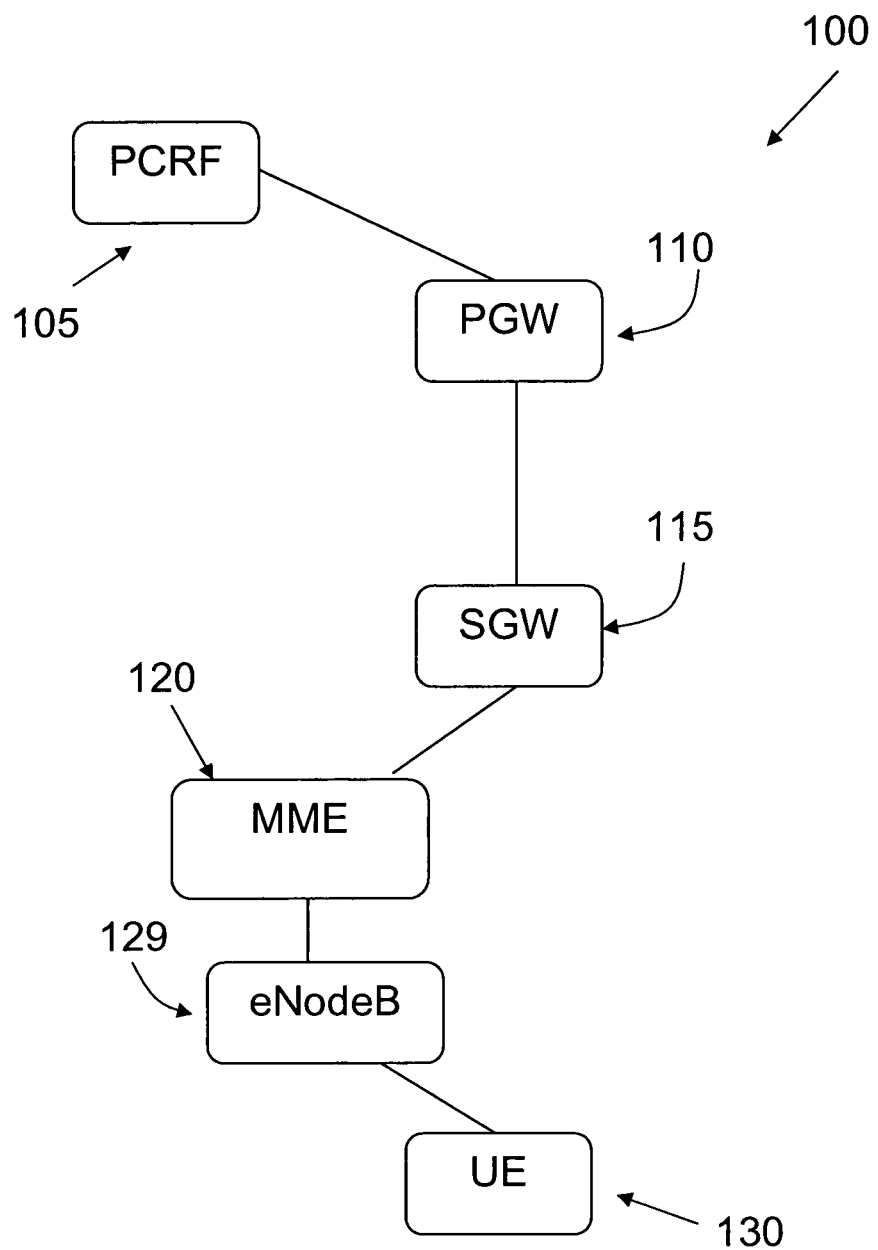
FIGS. 1 and 2 show schematic overviews of systems in which the invention is applied.

Embodiments of the present invention will be described more fully hereinafter with reference to the accompanying drawings, in which embodiments of the invention are shown. The invention may, however, be embodied in many different forms, and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a schematic view of a first system 100 in which the invention can be applied. The system 100 is a so called 2G/3G system, also sometimes referred to as a GERAN/UTRAN system. As shown, the system 100 can accommodate a number of User Equipments, UEs, one of which is shown as an example, with the reference number 130. Naturally, the system 100 can accommodate a large number of UEs, and is not limited to accommodating only one UE.

All traffic to and from the UE 130 is routed via a so called "base station", which, depending on the nature of the system, has different names. In the case of a GERAN/UTRAN system such as the one in FIG. 1, the base station is in this text referred to by the generic name "Radio Base Station", here and in FIG. 1 abbreviated as RBS. The RBS which the UE 130 is connected to is shown in FIG. 1 as RBS 128. One example of a system specific name for an RBS is NodeB, as used in 3G systems, and another example is BTS, Base Transceiver System, as used in some 2G systems.

Regardless of the kind of system, the mobility of the UE 130 is controlled by what will here initially be referred to generically as a "mobility management node", which, as shown in FIG. 1, in the case of GERAN/UTRAN is a so called S4-SGSN, shown as 125 in FIG. 1.

The "mobility management node" is connected to a Serving Gateway, an SGW 115, which in turn is connected to a PDN Gateway, PGW 110. The PGW 110 can be connected to a unit or a function for Policy and Charging Rules Function, a so called PCRF 105, or the PGW 110 can be arranged to take certain policy and charging actions on its own without the use of a PCRF.

Figure 2:
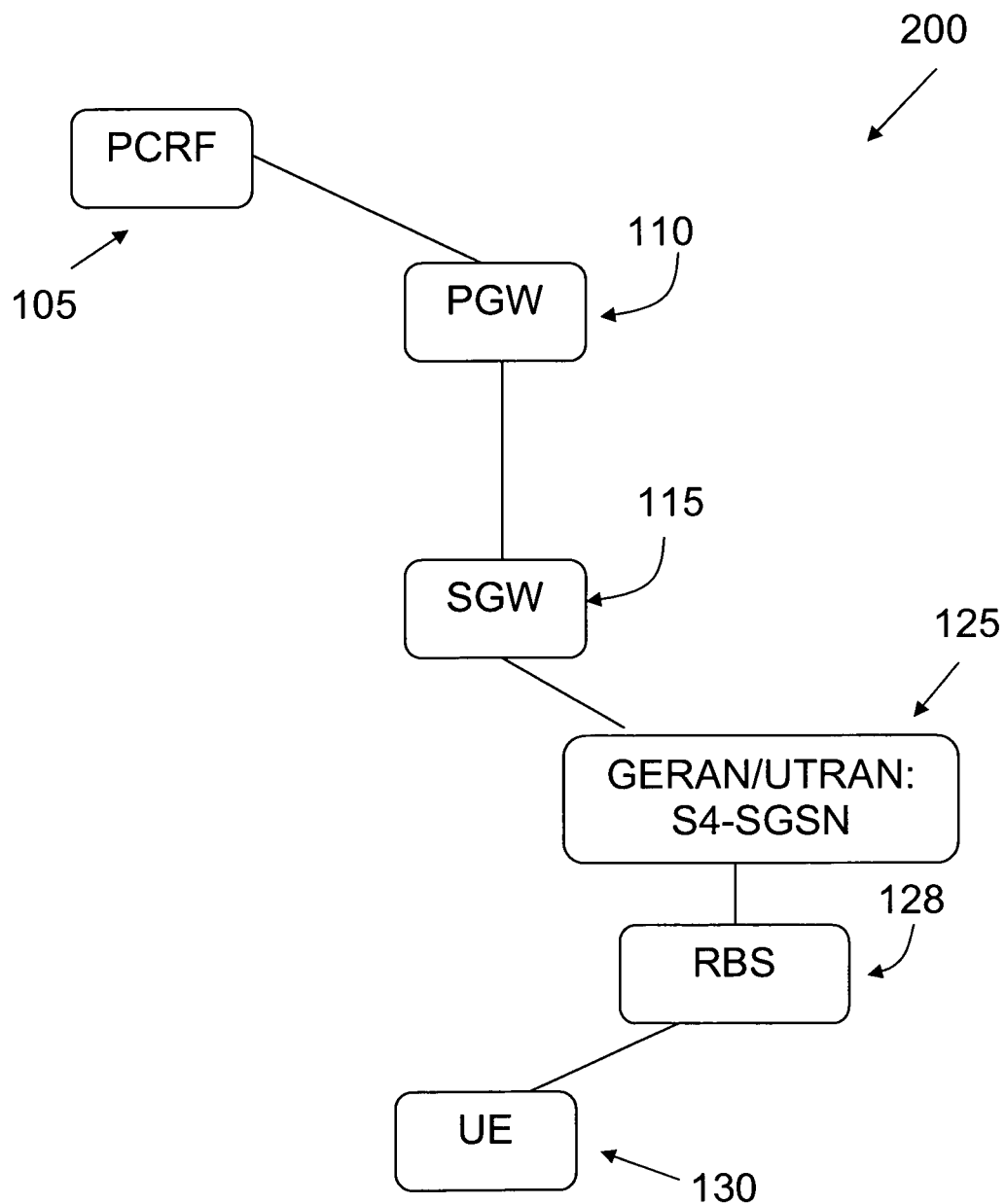

FIG. 2 shows a schematic overview of a second system 200 in which the invention can be applied. The system 200 is a so called LTE based system, also referred to as an EUTRAN system. It should be pointed out that the terms "LTE" and "LTE based" system is here used to include both present and future LTE based systems, such as, for example, advanced LTE systems.

In an EUTREAN system such as the one 200 in FIG. 2, the "base station" is referred to as an eNodeB, shown as 129 inn FIG. 2. The "mobility management node" is in an EUTRAN system referred to as a Mobility Management Entity, an MME, shown as 120 on FIG. 2. The SGW and PGW of the system in FIG. 2 are similar to those in FIG. 1, and will for that reason not be described again here, which is also the case for the PCRF 105.

It should be mentioned that although FIG. 1 shows a system 100 which is a GERAN/UTRAN system and FIG. 2 shows a system 200 which is an EUTRAN system, the invention can also be applied in systems which combine these two technologies, i.e. combined GERAN/UTRAN and EUTRAN systems.

A purpose of the invention is to facilitate the mobility of the UE within the system, or between different systems of either the same kind or of different kinds, i.e. mobility between a GERAN/UTRAN system and an EUTRAN system. A number of cases can be discerned here, for example the following:

- A user turns on his UE, and has moved into a network or system which does not belong to his "own" operator,
- A user tries to connect his UE to the Internet, or to establish some other kind of data connection to the system, but is located in a network or system which does not belong to his "own" operator
- A user's UE is in so called "idle mode", but the user moves into a network or system which does not belong to his "own" operator. In this case a so called Routing Area Update (in the case of GERAN/UTRAN systems) or a Tracking Area Update (in the case of EUTRAN system) will be performed,
- A user's UE is active and the user moves into a network or system which does not belong to his "own" operator. In this case a so called handover will be performed,
- A user's UE is either active or in so called idle mode, and the user moves into a part of the network or system which does not support the previously provided QoS.

In cases such as those enumerated above, the system or network into which the user has moved may have parameters or limits for QoS for UEs which differ from the parameters which the user of the UE has subscribed to previously. Such "misalignments" of the UE's QoS parameters are undesirable, and may in the worst case lead to a connection being terminated.

Such problems are addressed by the invention in that it discloses a "mobility management node" for wireless access systems, i.e. an MME for EUTRAN systems and an S4-SGSN for GERAN/UTRAN systems. The "mobility management node" is arranged to have an interface towards one or more User Equipments, UEs, and is also arranged to have an interface towards a Serving Gateway, an SGW, of the wireless access system Details of the functionality of the "mobility management node" will be shown by means of examples in the following, but in brief, the "mobility management node" is arranged to, upon reception of one or more predefined messages from a UE, or in the case of a change of mobility management node for an UE to another mobility management node and/or a change of PLMN for an UE, send a message to the SGW which the "mobility management node" interfaces with.

The message to the SGW comprises information on the maximum Quality of Service for the UE as allowed by the mobility management node, as well as information on the UE's subscribed Quality of Service. In addition, the "mobility management node" is also arranged to receive a message in response from the SGW, the response message indicating if the SGW and a Packet Data Gateway, a PGW, to which the SGW interfaces, support limitations of the UEs QoS in the "mobility management node". The "mobility management node" is arranged to, as a result of the reception of the response message, limit the UEs QoS so that it does not exceed the QoS allowed by the "mobility management node".

The invention also discloses a PGW adapted to interact, via an SGW, with the MME/S4-SGSN described above.

Some examples of the functions described above of the "mobility management node" and the PGW will now be given, with reference to the appended FIGS. 3-6, which show signaling diagrams for various mobility cases of a UE.

Figure 3:
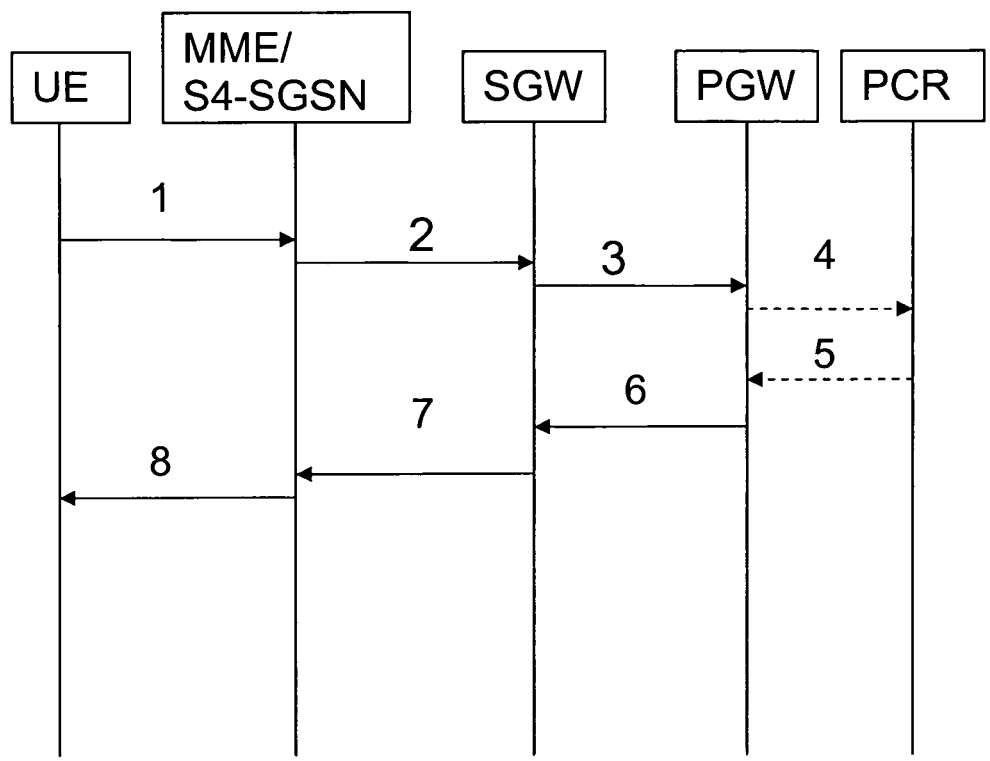
FIGS. 3-5 show signaling diagrams in various embodiments of the invention.

FIG. 3 shows the signaling in the cases where a user turns on his UE, and has moved into a network or system which does not belong to his "own" operator, or a user tries to connect his UE to the Internet, or to establish some other kind of data connection to the system, but is located in a network or system which does not belong to his "own" operator. With reference to the numbered arrows in FIG. 3, the following happens in such cases:

1. In the case of an UTRAN/GERAN system, the UE sends the message Activate PDP context request to the S4-SGSN, in order to attach to the system or to obtain a PDP connection. For an EUTRAN system, in order to gain access to the system, the UE sends the message Attach Request in the case where the UE needs to attach to the system, or the message PDN Connectivity Request in order to obtain additional PDN connections, i.e. if the UE already has one or more PDN connections.
2. The MME/S4-SGSN sends the message Create Session Request to the SGW. As disclosed by the invention, the Maximum allowed QoS, i.e. the QoS allowed by the MME/S4-SGSN, is included in this message in addition to the subscribed QoS related to the user request, i.e. the UE's subscribed QoS.
3. The SGW sends a Create Session Request message to the PGW. As disclosed by the invention, if the SGW supports the transmission of the Maximum allowed QoS parameter from the MME, the parameter is also included in the message to the PGW.
4. If the system includes a PCRF, and dynamic PCC, Policy and Charging Control, is used, a new Gx session between the PGW and the PCRF is initiated. As disclosed by the invention, the maximum QoS allowed by the MME/S4-SGSN is sent from the PGW to the PCRF over the Gx interface. In the case of roaming, the parameter may also be sent from the "local" PCRF, the so called V-PCRF, to the UE's "own" PCRF, the so called H-PCRF.
5. If dynamic PCC is used, the PCRF (the H-PCRF in the case of roaming) responds with a policy decision. If the PCRF supports the feature of sending a maximum allowed QoS as shown above, the PCRF will decide on a QoS for the UE which is not above the maximum allowed QoS for the default bearer of the UE or for any potential following dedicated bearers.
6. If dynamic PCC is not used, i.e. a PCRF is not used, 4 and 5 above do not apply. In this case, it is the PGW that makes a so called local policy decision, based e.g. on the system configuration. In this case, if the PGW supports the feature of transmitting the maximum allowed QoS from the MME/S4-SGSN, the PGW should decide on a QoS which is not higher than the maximum allowed QoS for the UE's default bearer or for any potential following dedicated bearers. The PGW responds with a Create Session Response (including the default bearer QoS it has decided on). As disclosed by the invention, if the PGW supports the "maximum allowed QoS feature", the PGW indicates this in the message to the SGW, i.e. in the Create Session Response message, as well as including the selected QoS.
7. The SGW sends the message Create Session Response to the MME/S4-SGSN, including the selected default bearer QoS. As disclosed by the invention, if the PGW indicated support for the "maximum allowed QoS feature" in its Create Session Response message to the MME/S4-SGSN, the SGW includes this in the Create Session Response message to the MME/S4-SGSN, along with the QoS selected by the PGW. The MME/S4-SGSN of the invention may reject the Attach Request/PDN connectivity Request/PDP Context Activation Request, if the received default bearer QoS is above the maximum allowed QoS.
8. The procedure is finalized.

Figure 4:
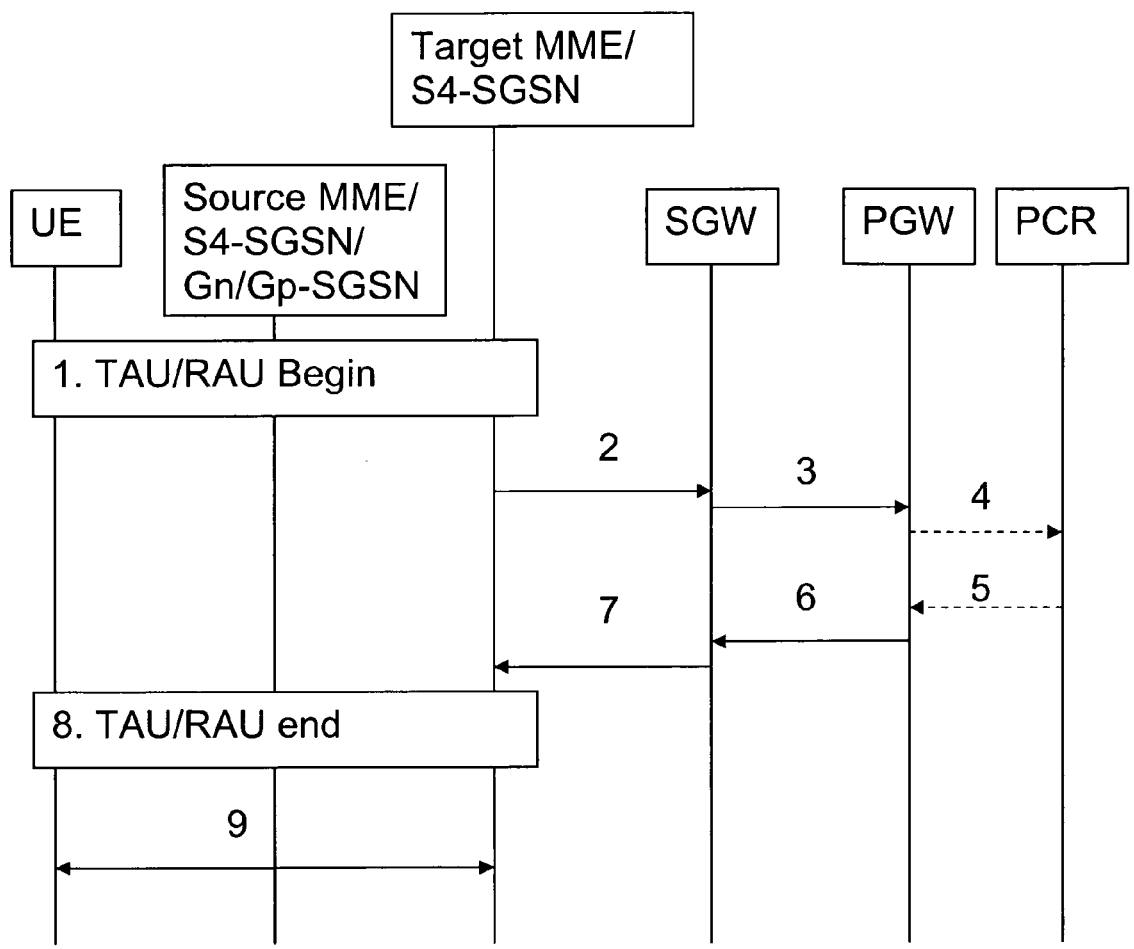

FIG. 4 shows the signaling in the case in which the UE is in the so called "idle mode", i.e. a state in which the UE is turned on but inactive. The term "idle mode" is here used as a generic term for a state which is referred to by different names in different systems, as follows: in 2G systems, the state is known as STANDBY, in 3G systems it is known as PMM-IDLE, and in LTE based systems it is known as ECM-IDLE.

With the UE in this state, the UE can still be transported so far that change of "mobility management entities" is necessary, i.e. a change between two MMEs/S4-SGSNs, referred to as the source MME/S4-SGSN and the target MME/S4-SGSN. In this case, i.e. if a change of "mobility management entities" is necessary in idle mode, in a GERAN/UTRAN system a so called RAU, Routing Area Update, is performed, while the corresponding procedure in an EUTRAN system is known as TAU, Tracking Area Update.

The signaling in this case is as follows, with reference to the numbered arrows of FIG. 4:

1. A TAU/RAU request is sent by the UE to the target MME/S4-SGSN, which triggers an exchange of context data from the source MME/S4-SGSN to the target MME/S4-SGSN.
2. The Target MME/S4-SGSN will send a Create Session Request message to the SGW if the SGW is relocated or a Modify Bearer Request to the SGW in case the SGW is not relocated. As disclosed by the invention, the maximum QoS allowed for the UE by the target MME/S4-SGSN is included in the message.
3. The SGW sends a Modify Bearer Request message to the PGW. As disclosed by the invention, in the case that the SGW supports the feature of transmitting the Maximum allowed QoS parameter from the MME/S4-SGSN, the parameter Maximum allowed QoS is also included in the Modify Bearer Request message to the PGW.
4. In the case that dynamic PCC, Policy and Charging Control, is used, an update may be initiated over the Gx interface. As disclosed by the invention, the maximum allowed QoS is sent from the PGW to the PCRF over Gx. In the case of roaming, the parameter "maximum allowed QoS" is in addition also included over S9 from the V-PCRF to the H-PCRF. The PGW is not required to await the PCRF answer but may proceed directly with 6 below before the message in 5 below is received.
5. In the case of dynamic PCC, the (H-)PCRF responds with a policy decision. As disclosed by the invention, in the case that the PCRF supports the feature of transmitting maximum allowed QoS, the PCRF should decide on a QoS which is not higher than the provided maximum allowed QoS for the default bearer of the UE or for any potential following dedicated bearers for the UE.

As also disclosed by the invention, if the message from the PCRF is received after the PGW has responded with a Modify Bearer Response to the SGW and the policy decision from the PCRF is not the maximum allowed QoS that was accepted for the existing bearers of the PDN connection, then the PGW shall attempt to update the affected bearers with the applicable QoS, i.e. the QoS decided by the PCRF.

6. If dynamic PCC was not deployed in the network, i.e. a PCRF is not used, 4 and 5 above do not apply. In this case, it is the PGW that makes a local policy decision regarding QoS for the UE, based on e.g. the system configuration. As disclosed by the invention, in this case, and if the PGW supports the feature of transmitting the maximum allowed QoS, it will not decide on a QoS higher than the provided maximum allowed QoS for the default bearer of the UE or for any potential dedicated bearers for the UE. The PGW responds to the SGW with the message Modify Bearer Response. As disclosed by the invention, if the PGW supports the proposed feature of transmitting the Maximum allowed QoS, and if the Maximum allowed QoS is lower than the current QoS of the PDN connections or any of the related bearers, the PGW may indicate that it accepts the MME/S4-SGSN provided maximum allowed QoS in the Modify Bearer Response, and the PGW may also indicate the selected QoS.

7. The serving GW sends the message Create Session Response or the message Modify Bearer Response to the MME/S4-SGSN. As disclosed by the invention, if a maximum allowed QoS was provided from the PGW, the SGW will include it in the message to the MME/S4-SGSN. The SGW may indicate the selected QoS to MME/S4-SGSN, if provided by PGW. The MME/S4-SGSN may reject the TAU/RAU request, if the received default bearer QoS is above the max allowed QoS.

8. The RAU/TAU procedure is finalized according to standard procedures.

9. In embodiments of the invention, after the TAU/RAU Accept has been sent to the UE by the target MME/S4-SGSN, if the Maximum allowed QoS is lower than or equal to the current QoS of the PDN connections of the UE or any of the related bearers of the UE, and the PGW has indicated that it accepts the MME/S4-SGSN provided maximum allowed QoS in the Modify Bearer Response, then the MME may initiate a Modify EPS (Evolved Packet System) Bearer Context, or in the case of an S4-SGSN, the S4-SGSN may initiate a Modify PDP-context procedure towards the UE. When the MME/S4-SGSN receives the Modify EPS Bearer Context Accept/Modify PDP Context Accept from the UE, there should be no signaling towards the Serving GW. Also, modification from the MME/S4-SGSN towards the eNodeB/RNC/BSC may be initiated for this reason and without any signaling towards the Serving GW.

Figure 5:
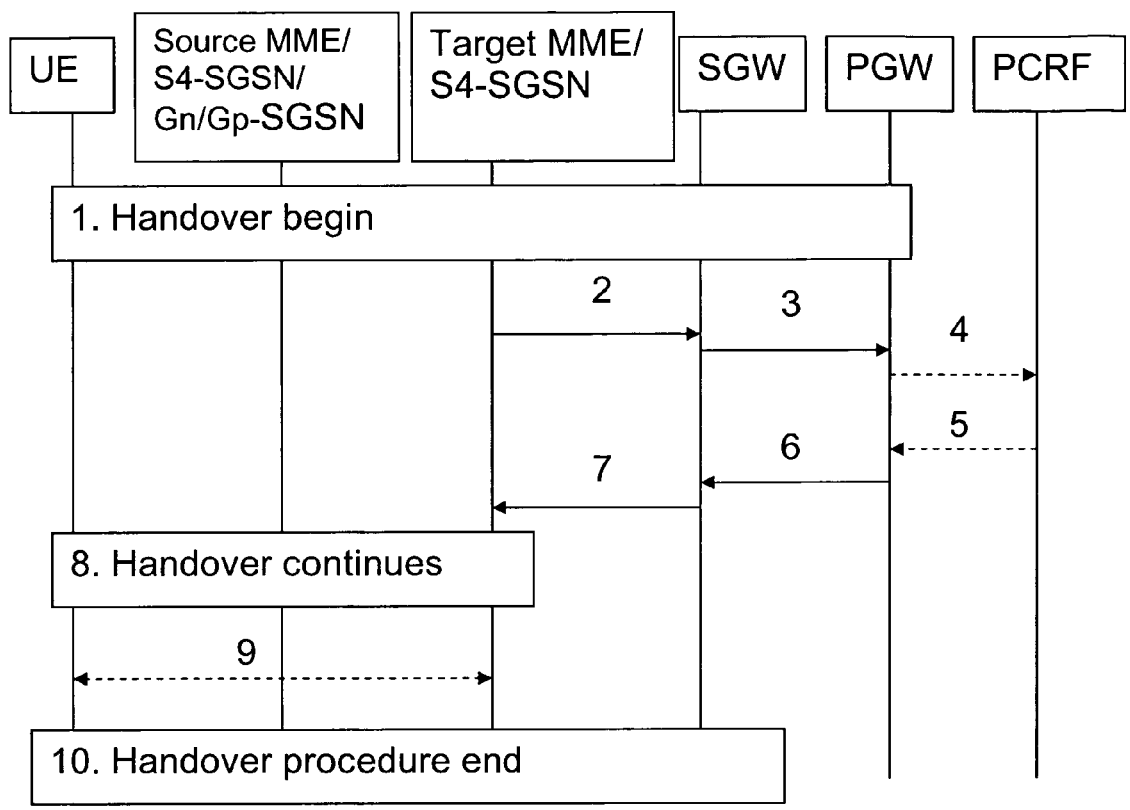

FIG. 5 shows the signaling in the case of handover where the mobility management node which serves the UE is changed, i.e. if the UE is active, and is to be handed over from a source MME/S4-SGSN to a target MM/S4-SGSN, and may include the case where the UE changes PLMN, for example from the PLMN of one operator to the PLMN o another operator. These handover procedures include the following:
S1 based handover procedure and IRAT handover procedure, both with and without SGW change, as defined at present in 3GPP TS 23.401
3G SGSN (Gn/Gp-SGSN) to MME combined hard handover and SRNS relocation procedure, as defined at present in 3GPP TS 23.401
S4-SGSN based SRNS relocation procedure, as defined at present in 3GPP TS 23.060.
PS handover procedure, as defined at present in 3GPP TS 43.129.

The signalling in this case is as follows, with reference to the numbered arrows of FIG. 5:

1. The handover procedure begins, including the preparation phase and the beginning of execution phase to the target MME/S4-SGSN. This will trigger an exchange of context data from source MME/S4-SGSN to the target MME/S4-SGSN.

2. The Target MME/S4-SGSN will send a Create Session Request message to the SGW in case the SGW is relocated or a Modify Bearer Request to the SGW in case the SGW is not relocated. According to the invention, the maximum QoS allowed by the target MME/S4-SGSN for the UE is included in the message.

3. The SGW sends a Modify Bearer Request message to the PGW. As disclosed by the invention, if the SGW supports transmittal of the parameter Maximum allowed QoS, this parameter or parameters is/are also included in the message to the PGW.

4. If dynamic PCC is used, i.e. a separate unit or function for PCRF is used, an update may be initiated over the Gx interface. As disclosed by the invention, the maximum QoS allowed by the target MME/S4-SGSn is sent from the PGW to the PCRF over the Gx interface. In the case of roaming, the parameter "maximum QoS" is in addition included over S9 from V-PCRF to H-PCRF.

5. In the case of dynamic PCC, the (H-)PCRF responds with a policy decision. As disclosed by the invention, if the PCRF supports the feature of transferring the maximum allowed QoS parameter, it should not decide on a QoS higher than the provided maximum allowed QoS for the default bearer of the UE or for any potential following dedicated bearers for the UE.

6. If dynamic PCC is not used in the system, 4 and 5 above do not apply. In this case, it is the PGW that makes a local policy decision on QoS for the UE, based e.g. on configuration. As disclosed by the invention, if the PGW supports the feature of transferring the maximum allowed QoS parameter, the PGW should not decide on a QoS which is higher than the provided maximum allowed QoS for the default bearer for the UE or for any potential dedicated bearers for the UE. The PGW responds with a Modify Bearer Response. In embodiments of the invention, if the PGW supports the feature of transferring the maximum allowed QoS parameter, and if the Maximum allowed QoS was lower than the current QoS of the PDN connections of the UE or any of the related bearers of the UE, the PGW may indicate in the Modify Bearer Response that it accepts the maximum allowed QoS as provided by the MME/S4-SGSN. In addition, the PGW may also indicate a selected QoS.

If the policy decision, made either locally by the PGW or received from the PCRF in the case that dynamic PCC is used, was above the maximum allowed QoS that was accepted for the existing bearers of the PDN connection, then the PGW will attempt to update the affected bearers with the applicable QoS, i.e. the QoS selected by the PCRF directly after this procedure.

7. The serving GW sends the message Create Session Response or the message Modify Bearer Response to the MME/S4-SGSN. As disclosed by the invention, if the new indicator "maximum allowed QoS" was provided from the PGW, the SGW will include this in the message to the MME/S4-SGSN as well. The SGW may indicate the selected QoS to MME/S4-SGSN if provided by the PGW.

8. The handover procedure continues.
9. As disclosed by the invention, after the TAU/RAU Accept has been sent to the UE, if the Maximum allowed QoS is lower than or equal to the current QoS of the PDN connections or any of the related bearers, and the PGW has indicated that it accepts the MME/S4-SGSN provided maximum allowed QoS in the Modify Bearer Response, then an MME may initiate a Modify EPS Bearer Context, and in the case of an S4-SGSN, the S4-SGSN may initiate SGSN initiated Modify PDP-context procedure towards the UE. When the MME/S4-SGSN receives the Modify EPS Bearer Context Accept/Modify PDP Context Accept from the UE, there should be no signaling towards the Serving GW. Also, a modification from the MME/S4-SGSN towards the eNodeB/RNC/BSC may be initiated for this reason, without any signaling towards the SGW.
10. The handover procedure concludes.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A mobility management node for a wireless access system, the mobility management node, comprising:
a memory and a data processing system coupled to the memory, wherein the data processing system is configured to:
serve a user equipment (UE) in a Public Land Mobile Network (PLMN),
send a message to a Serving Gateway (SGW), the message comprising first information identifying a maximum quality of service (QoS) for the UE as allowed by the mobility management node, and separate and distinct second information identifying a subscribed QoS for the UE,
receive a response message from the SGW,
determine whether the response message includes support information indicating that the SGW and a Packet Data Gateway (PGW), to which the SGW interfaces, support limitations of the UEs QoS by the mobility management node, and
limit the UE's QoS so that the UE's QoS corresponds to the maximum QoS allowed by the mobility management node as a result of determining that the response message includes said support information, wherein
the mobility management node is an S4-SGSN for a GERAN/UTRAN system,
the data processing system is configured to send the message to the SGW in response to receiving from the UE at least one of an Activate PDP context request message and Routing Area Update request message, and
the message to the SGW is a Create Session request message or a Modify Bearer Request message.

2. The mobility management node of claim 1, wherein the mobility management node is a Mobility Management Entity, MME, for an LTE system.

3. The mobility management node of claim 2, wherein the data processing system is configured to send the message to the SGW in response to receiving from the UE at least one of an attach request message, a PDN connectivity request and Tracking Area Update request message.

4. The mobility management node of claim 2, wherein the message to the SGW is a Create Session request message or a Modify Bearer Request message.

5. The mobility management node of claim 1, wherein the response message from the SGW is one of a Create Session Response and Modify Bearer Response.

6. A Packet Data Network Gateway (PGW) for a GERAN/UTRAN or LTE system, the PGW comprising:
a memory; and
a data processing system coupled to the memory, wherein the data processing system is configured to:
receive, via a Serving Gateway (SGW), a message from a mobility management node, the message comprising first information identifying a maximum quality of service (QoS) allowed by the mobility management node for a UE which is served by the mobility management node, and separate and distinct second information identifying the subscribed QoS for the UE, and
respond to the message by transmitting towards the mobility management node a message indicating that the PGW supports limiting of the UE's QoS in the mobility management node, wherein
the data processing system is further configured to: initiate a session between the PGW and a Policy and Charging Rules Function (PCRF); send to the PCRF the maximum QoS allowed by the mobility management node; and receive from the PCRF a QoS for the UE which is not above the maximum QoS allowed by the mobility management node, and the response message to the mobility management node comprises the QoS received from the PCRF.

7. The mobility management node of claim 1, wherein the data processing system is configured to send the message in response to a context data received from a source mobility management node.

8. The mobility management node of claim 7, wherein the context data is received from the source mobility management node in response to the UE requiring a change of mobility management entities.

9. A method for quality of service (QoS) control, the method comprising:

receiving, by a mobility management node (MMN), a first message related to a mobile communication device (MCD);

transmitting to a serving gateway (SGW), by the MMN, as a result of receiving the first message related to the MCD, a second message comprising first QoS information identifying a maximum allowed QoS for the MCD;

transmitting to a packet data network gateway (PGW), by the SGW, as a result of receiving the second message, a third message comprising the first QoS information;

after the PGW receives the third message, selecting a QoS for the MCD based on the identified maximum allowed QoS for the MCD;

after selecting the QoS for the MCD, the PGW transmitting to the SGW a fourth message comprising separate and distinct second information identifying the selected QoS for the MCD;

as a result of receiving the fourth message, transmitting by the SGW to the MMN a fifth message comprising the second QoS information;

the MMN, after receiving the fifth message, determining whether the selected QoS exceeds the maximum allowed QoS, wherein the first message is an Attach Request transmitted by the MCD, the second message is a first Create Session Request, the third message is a second Create Session Request, the fourth message is a first Create Session Response, and the fifth message is a second Create Session Response.

10. The method of claim 9, wherein the selected QoS does not exceed the identified maximum allowed QoS.

11. The method of claim 10, wherein the PGW performs the step of selecting a QoS for the MCD.

12. The method of claim 10, further comprising the PGW sending to a Policy and Charging Rules Function (PCRF) a message comprising the first QoS information identifying the maximum allowed QoS, wherein the PCRF performs the step of selecting the QoS for the MCD.

\* \* \* \* \*